United States Patent [19]

Irikura

[11] Patent Number: 4,510,554
[45] Date of Patent: Apr. 9, 1985

[54] CHIP-LIKE SOLID ELECTROLYTE CAPACITOR

[75] Inventor: Tsutomu Irikura, Joyo, Japan

[73] Assignee: Matsushita Electric Industrial Co., Ltd., Kadoma, Japan

[21] Appl. No.: 440,219

[22] PCT Filed: Feb. 23, 1982

[86] PCT No.: PCT/JP82/00048
§ 371 Date: Oct. 22, 1982
§ 102(e) Date: Oct. 22, 1982

[87] PCT Pub. No.: WO82/02978
PCT Pub. Date: Sep. 2, 1982

[30] Foreign Application Priority Data

Feb. 23, 1981 [JP] Japan ................................. 56-25776

[51] Int. Cl.$^3$ .................. H01G 9/00; H01G 1/14; H01G 5/01
[52] U.S. Cl. ...................................... 361/433; 29/570; 361/310
[58] Field of Search ............... 361/433, 278, 306–310; 29/570

[56] References Cited

U.S. PATENT DOCUMENTS 4,288,842  9/1981  Voyles ................................. 361/433

FOREIGN PATENT DOCUMENTS

| 55-50618 | 4/1975 | Japan . |
| 51-36047 | 3/1976 | Japan . |
| 52-82045 | 6/1977 | Japan . |
| 53-01045 | 1/1978 | Japan . |
| 154252 | 10/1980 | Japan . |
| 57-78129 | 5/1982 | Japan . |

Primary Examiner—L. T. Hix
Assistant Examiner—Douglas S. Lee
Attorney, Agent, or Firm—Wenderoth, Lind & Ponack

[57] ABSTRACT

This invention relates to a chip-like solid electrolyte capacitor of the face-bonding type mold-encapsulated with insulative resin, wherein the cathode terminal connected to the cathode layer of a capacitor element is provided with a U-shaped fixing portion, a neck portion smaller in width than the width of the fixing portion, a vertical portion having first and second bent portions and an external connection portion only, the U-shaped fixing portion of the cathode terminal being connected by soldering to the cathode layer of the capacitor element so that any mechanical stress imposed on the capacitor element during the encapsulation can be absorbed by the vertical portion without causing it to act on the capacitor element.

4 Claims, 14 Drawing Figures

CHIP-LIKE SOLID ELECTROLYTE CAPACITOR

FIELD OF TECHNOLOGY

This invention relates to a chip-like solid electrolyte capacitor of the face-bonding type mold-encapsulated in insulative resin.

BACKGROUND OF THE INVENTION

Hitherto, this type of chip-like solid electrolyte capacitor has been formed by preparing a capacitor element formed by sequentially depositing a layer of semiconductor metal oxide such as manganese dioxide and a cathode layer made of carbon silver paint, on an anode which is a sintered body of a valve metal such as tantalum having an anode lead-out line, which is made of a valve metal such as tantalum, and also having a surface thereof provided with a dielectric oxidizing film, and then encapsulating this capacitor element in an electrically insulative resin. From this capacitor body extend an anode terminal, connected to the anode lead-out line, and a cathode terminal connected to the cathode layer.

Representative examples of conventional chip-like solid electrolyte capacitors are shown in FIGS. 1(a) and 1(b) and FIGS. 2(a) and 2(b). In FIGS. 1(a) and 1(b) is shown a capacitor element 1 mold-encapsulated in an insulative resin 2 to provide a capacitor body 3 and having a solderable anode terminal 4 connected by welding to an anode lead-out line 1a of the capacitor element 1 and a solderable cathode terminal 5 connected by soldering to an anode layer in the outer shell of the capacitor element 1. The terminals extend outwards from the bottom face of the capacitor body 3. In FIGS. 2(a) and (b) is shown a capacitor body with the anode terminal 4 and the cathode terminal 5 extending outwards from the opposite end faces of the capacitor body 3 and then bent so as to extend along the end face and bottom face.

When such a chip-like solid electrolyte capacitor is to be manufactured, manufacturing is carried out by steps such as shown in FIG. 3. FIG. 3 illustrates manufacturing steps for the manufacture of the chip-like solid electrolyte capacitor shown in FIGS. 1(a) and (b) and is a method which comprises perforating a lead frame 6 to provide two tongues 4' and 5' such as at step A, subsequently bending the tongues 4' and 5' to form the anode and cathode terminals 4 and 5 such as at step B, placing the capacitor element 1 on the anode and cathode terminals 4 and 5 such as at step C, connecting the anode lead-out line 1a and the cathode layer in the outer shell of the capacitor element 1 with the anode terminal 4 and the cathode terminal 5 such as at step D and simultaneously cutting the anode lead-out line 1a adjacent the capacitor element 1, mold-encapsulating the capacitor element 1, including portions of the anode and cathode terminals 4 and 5, with insulative resin 2 such as at step E, and separating the anode and cathode terminals 4 and 5 from the lead frame 6. It is to be noted that the capacitor element 1 is positioned on the lead frame 6 with the anode lead-out line 1a fixed by welding to a retainer plate 7.

However, in such a conventional chip-like solid electrolyte capacitor, in the construction as shown in FIGS. 1(a) and (b), there is a disadvantage in that both terminals of the anode and cathode terminals 4 and 5 extend outwardly from the capacitor body 3 and the overall dimensions are large and, also, it is not possible to apply the capacitor body to a substrate by a method other than a so-called reflow-soldering method wherein, after placing the capacitor body on a printed substrate, excess solder which has been attached by heating the printed substrate, is re-fused to effect the soldering. On the other hand, in the construction shown in FIGS. 2(a) and (b), since the anode and cathode terminals 4 and 5 are bent so as to extend along the end and bottom faces of the capacitor body 3, the overall size is small, but since the surface areas of the anode and cathode terminals 4 and 5 exposed to the end face of the capacitor body 3 are still small and the widths of these terminals are far smaller than the width of the capacitor body 3, incorporation onto the printed substrate can, as is the case with the former, only be effected by the reflow-soldering method.

Moreover, as is clear from the manufacturing method shown in FIG. 3, the positioning of the anode and cathode terminals 4 and 5 of the capacitor body 3 is not carried out with any great precision and, therefore, the positions at which the anode terminal 4 and the cathode terminal 5 are connected vary resulting in such a disadvantage that the quality of the capacitor bodies vary from one to another.

In order to obviate these problems, the inventors developed a chip-like solid electrolyte capacitor such as shown in FIG. 4.

In FIG. 4, an anode terminal 8 is connected by a weld 9 to an anode lead-out line 1a of the capacitor element 1, and a cathode terminal 10 is provided which has a U-shaped fixing portion 10a, a neck portion 10b, a vertical portion 10c and an external connection portion 10d. 11 designates a soldering area. The fixing and neck portions 10a and 10b of the cathode terminal 10 are fixed by soldering in the soldering area 11 to the cathode layer in the outer shell of the capacitor element 1 in a position above the capacitor element 1 while to the vertical portion 10c having first and second bent portions 10e and 10f bent at right angles to the neck portion 10b and having a width smaller than the fixing portion 10a is integrally continuously connected the U-shaped external connection portion 10d opening in a direction towards the capacitor element 1.

In the capacitor having such a construction, although it is ideal to make the anode terminal face and the horizontal plane of the cathode terminal flush with each other after the soldering of the cathode terminal 10 to the capacitor element 1 and the welding of the anode terminal 8 to the anode lead-out line 1a, since the shape of the cathode terminal 10 is complicated as can be seen from FIG. 4, the dimensions of the cathode terminal 10 tend to deviate considerably and, in the event that upper and lower molds are clamped together after the insertion of the capacitor during the transfer molding process, the horizontal planes of the anode terminal face and the cathode terminal face are displaced and, therefore, not only is an excessive mechanical stress imposed on the capacitor element 1, but also the mechanical stress imposed on the capacitor element 1 is further increased by the effect of the pressure applied to the capacitor element 1 during the injection of resin into a space formed between the upper and lower molds, resulting in deterioration of the capacitor element 1. In addition, since the hardening of the resin takes place at a high temperature of 130° C. to 200° C., the anode and cathode terminals 8 and 10 are caused to expand due to the high temperature and a mechanical stress separate from said mechanical stress is imposed on the capacitor element 1, thereby causing the problem that the capacitor element 1 is caused to deteriorate.

DISCLOSURE OF THE INVENTION

This invention seeks to provide a chip-like solid electrolyte capacitor wherein the U-shaped fixing portion of the cathode terminal is connected by soldering to the cathode layer of the capacitor element in a way such that the mechanical stress imposed on the capacitor element can be absorbed and, also, even though the dimensions of the anode and cathode terminals vary considerably, the anode terminal face and the cathode terminal face can be held flush in the horizontal plane.

BEST MODE FOR CARRYING OUT THE INVENTION

Figure 1A:
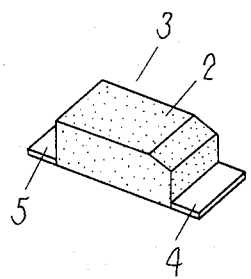
FIGS. 1(a) and 1(b) are perspective and sectional views of a conventional chip-like solid electrolyte capacitor.
Figure 1B:
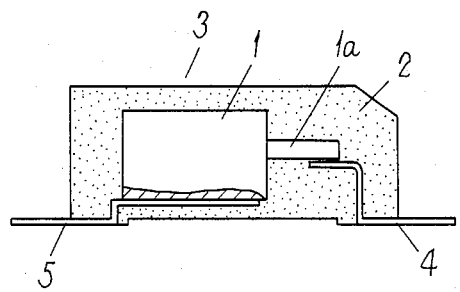
Figure 2A:
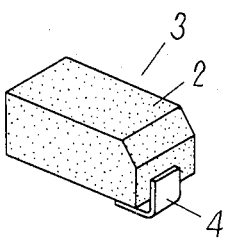
FIGS. 2(a) and 2(b) are perspective and sectional views of another conventional chip-like solid electrolyte capacitor.
Figure 2B:
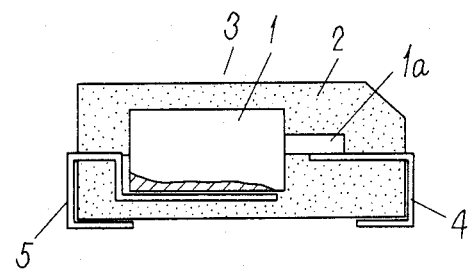
Figure 3:
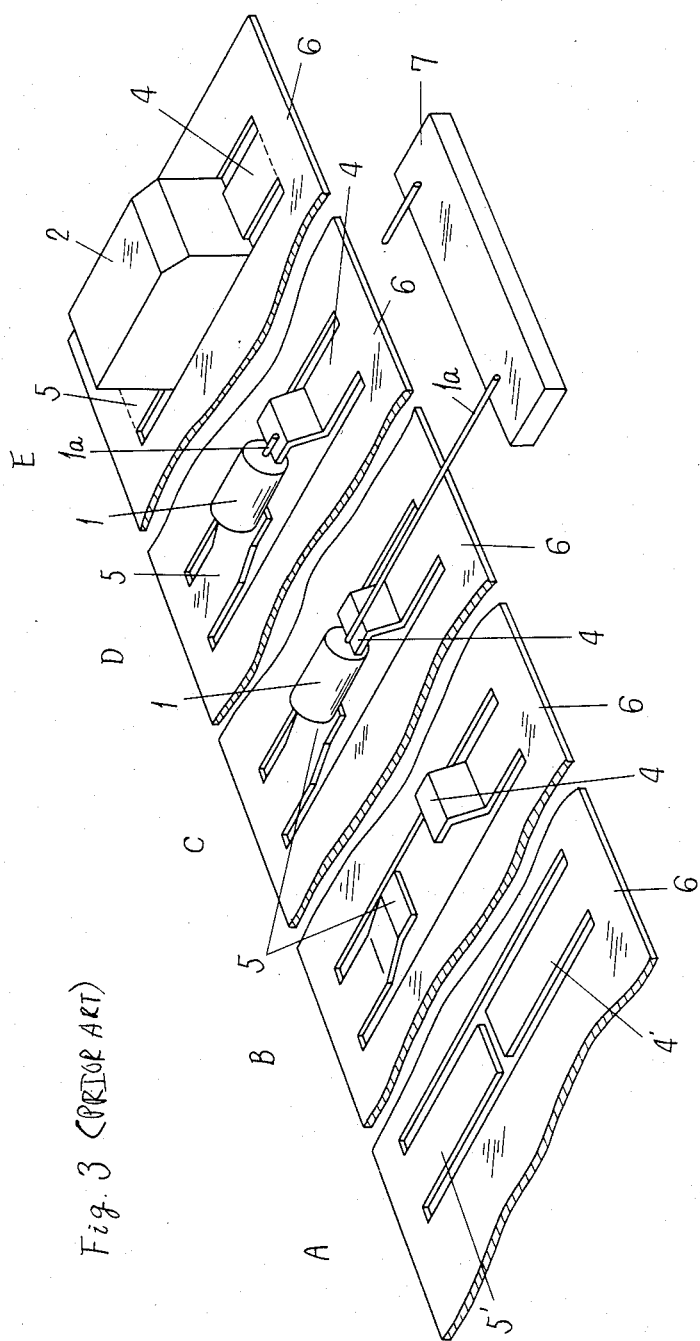
FIG. 3 is a perspective view showing the manufacturing steps for the manufacture of the chip-like solid electrolyte capacitor shown in FIGS. 1(a) and 1(b)

FIGS. 5 to 9 illustrate one embodiment of a chip-like solid electrolyte capacitor according to this invention and, in these figures, a capacitor element 12 is, as is the case with the prior art, provided with an anode lead-out line 12a made of a valve metal such as tantalum and is formed by sequentially depositing a semiconductor metal oxide such as manganese dioxide and a cathode layer made of carbon silver paint on an anode body which is a sintered body of valve metal having a dielectric oxidizing film formed on a surface thereof.

An anode terminal 13 is connected by a weld 14 to the anode lead-out line 12a of the capacitor element 12, and a cathode terminal 15 is connected to the cathode layer of the capacitor element 12 by means of solder 16, and an insulative resin 17 encapsulates the capacitor element 12, including portions of the anode and cathode terminals 13 and 15, during the transfer molding process, a capacitor body 18 being formed by mold-encapsulating the capacitor element 12 with the insulative resin 17, in which capacitor body the anode and cathode terminals 13 and 15 extend out of the opposite end faces of the capacitor body 18 and then bend downwardly of the capacitor body 18 and extend along the end and bottom faces thereof in an L-shape to provide external connection portions 13a and 15a. The external connection portions 13a and 15a of the anode and cathode terminals 13 and 15 which are exposed to the outside have a width equal to the width of the capacitor body 18 and both portions of the anode and cathode terminals 13 and 15, embedded in the insulative resin 17, and the intermediate portion of the external connection portions 13a and 15a exposed to the outside are provided with respective slits 19 and 20 dividing them into halves whereby the anode and cathode terminals 13 and 15 are formed into four terminal pieces.

In addition, a portion of the cathode terminal 15 embedded in the insulative resin 17 is bent into a U-shaped fixing portion 15b, and a neck portion 15c smaller in width than the fixing portion 15b and a vertical portion 15d extend from the fixing portion 15b to the connection portions 15a. The fixing portion 15b is fixed by soldering to the capacitor element 12 and the neck portion 15c extending from the fixing portion 15b is soldered to the capacitor element 12 only at a portion adjacent to the fixing portion 15b, but the full length thereof is soldered, so as to permit the vertical portion 15d extending from the tip of the neck portion 15c and the external connection portion 15a to move freely. In this construction, when the resin encapsulation is carried out by means of a method such as the transfer molding process, the mechanical stress imposed during the resin encapsulation is absorbed by the first and second bent portion 15e and 15f and the mechanical stress imposed on the capacitor element 12 is minimized. At this time, although connection may be performed by any suitable method such as, for example, by forming in advance a solder layer on a portion on the side of the capacitor element 12 or forming in advance a solder layer only on the U-shaped fixing portion 15b of the cathode terminal 15, the width of the soldered connection formed by the solder 16 should be so designed that, when heated, the neck portion 15c and the capacitor element 12 are fixed together by soldering as a result of the flow of the solder.

Figure 6:
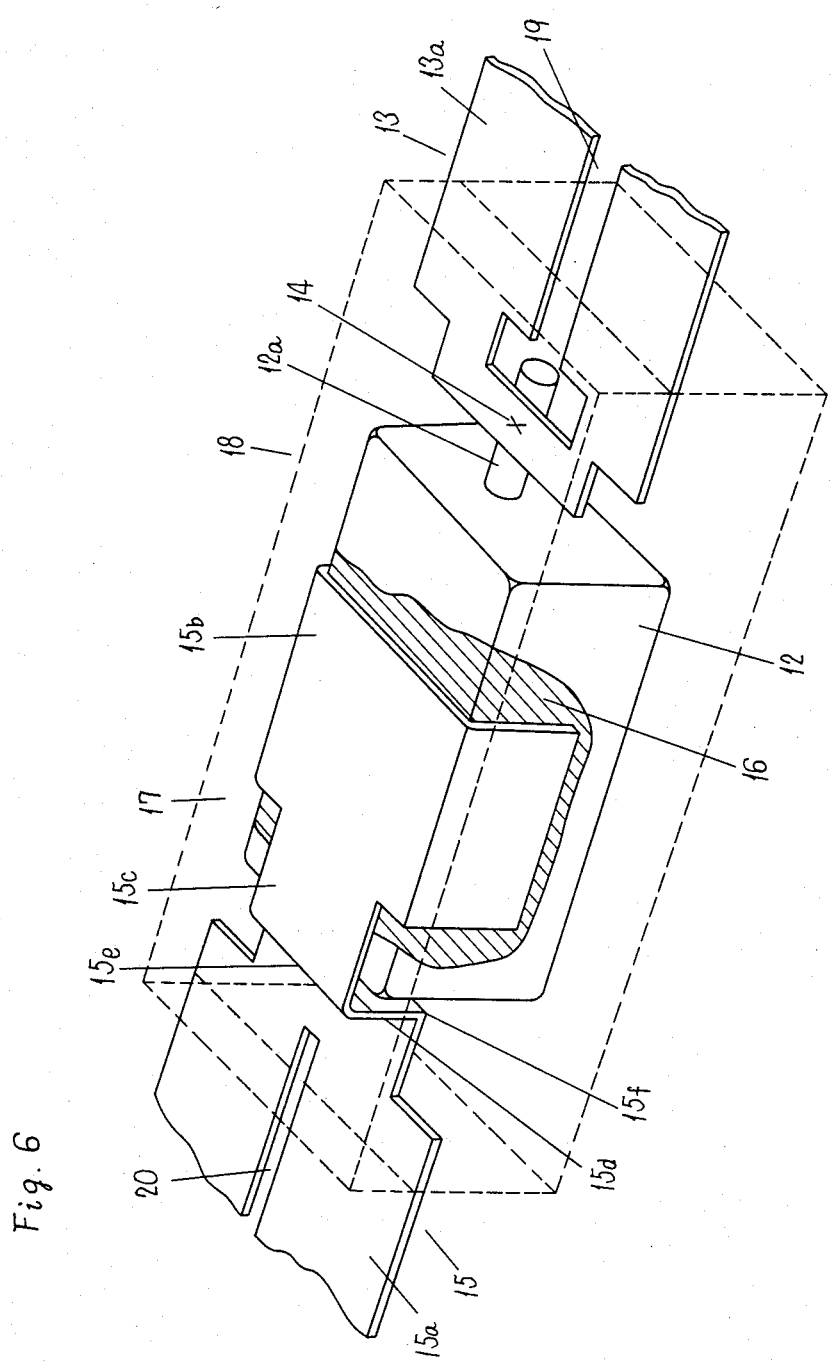

FIG. 6 illustrates the condition in which the article wherein the capacitor element 12 is connected to the anode and cathode terminals 13 and 15 by means of the solder 16 as hereinbefore described is set in the mold assembly and the resin is injected by means of the transfer molding process to cause it to be encapsulated with the resin.

Figure 7:
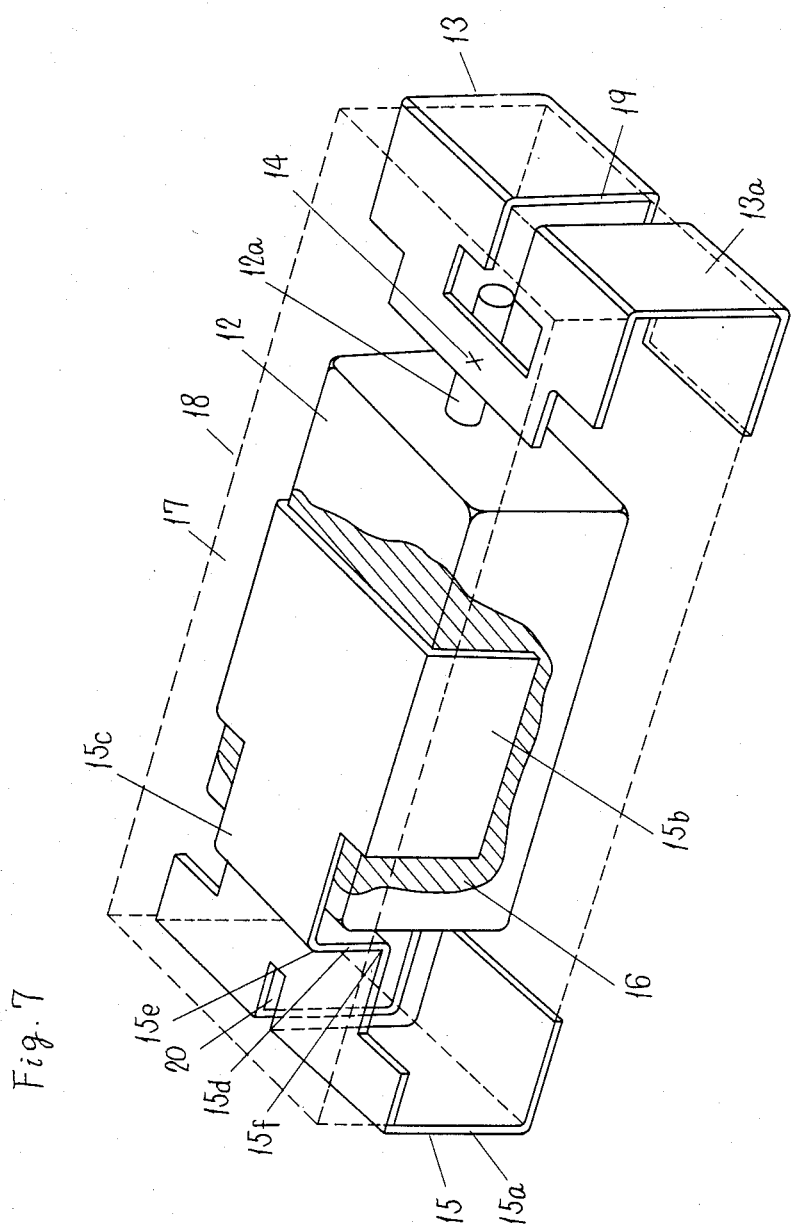
Figure 8:
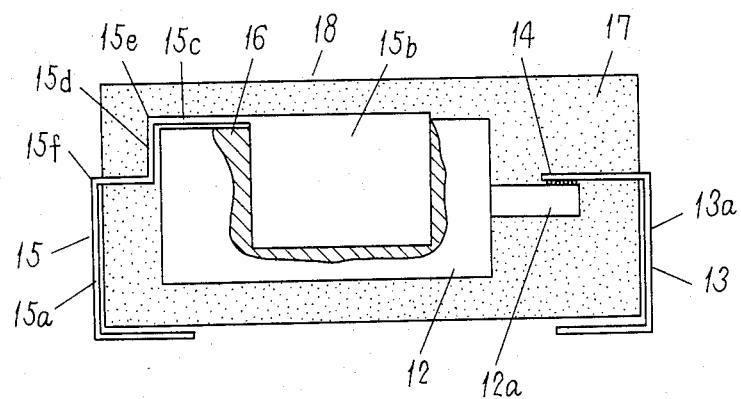
FIG. 8 is a longitudinal vertical sectional view of the complete capacitor shown in FIG. 7.
Figure 9:
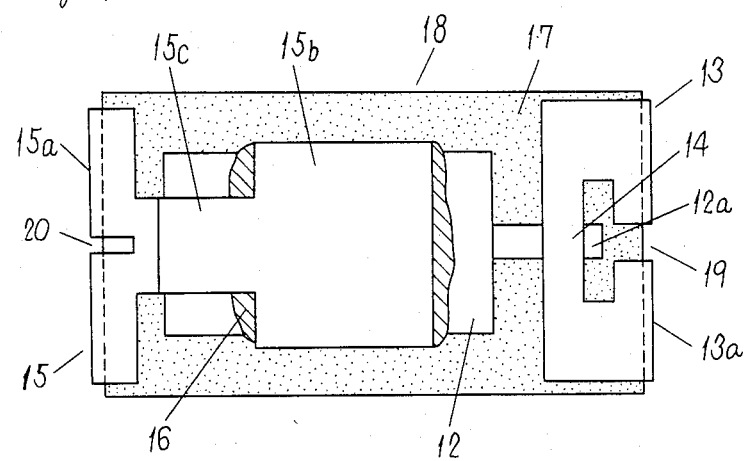
FIG. 9 is a sectional top plan view of the capacitor shown in FIG. 8.

FIGS. 7 to 9 illustrate the condition in which a bending process is effected on the anode and cathode terminals 13 and 15 to finish the article.

Figure 10:
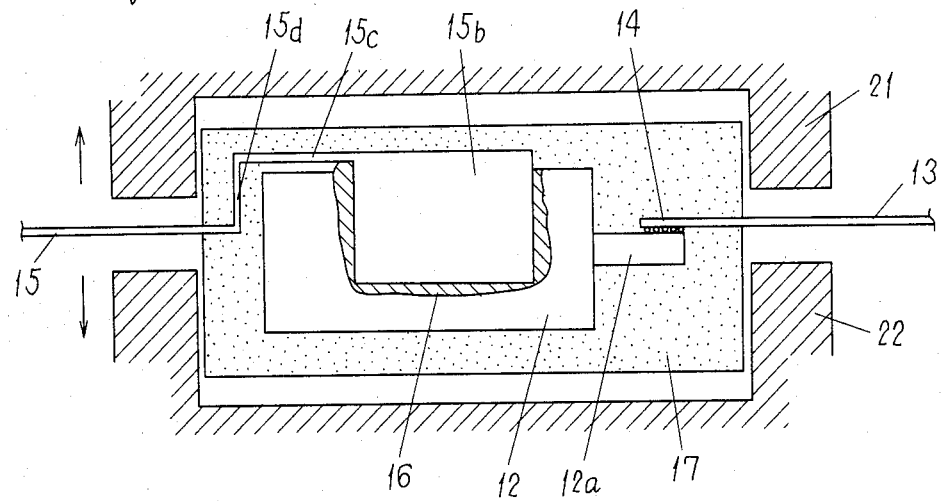
FIG. 10 is a sectional view similar to FIG. 8 of the capacitor in an ideal condition in which no mechanical stress is produced in the capacitor element.
Figure 11:
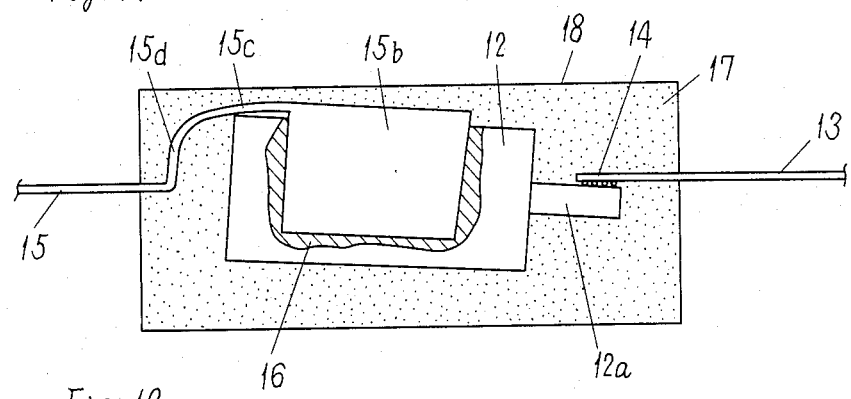
FIG. 11 is a sectional view similar to FIG. 8 of the same capacitor with the cathode terminal displaced relative to the anode terminal.
Figure 12:
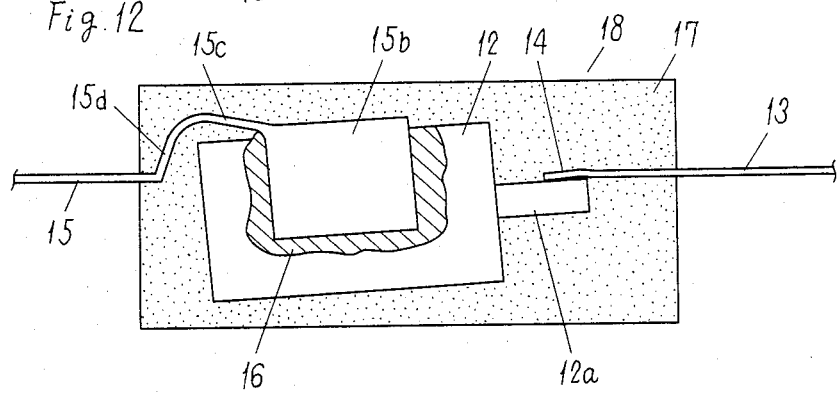
FIG. 12 is a sectional view similar to FIG. 8 of the same capacitor with the anode terminal displaced relative to the cathode terminal.

The manner in which the disadvantages inherent in the prior art have been eliminated by connecting the cathode terminal 15 and the capacitor element 12 in the manner as hereinbefore described is shown in FIGS. 10 to 12.

FIG. 10 illustrates the condition in which the cathode terminal face and the horizontal plane of the anode terminal face are flush with each other and wherein no stress is required to be absorbed at the bent portions, FIG. 11 illustrates the case in which the cathode terminal 15 is tilted relative to the anode terminal 13 and FIG. 12 illustrates the case in which, opposite to the case shown in FIG. 11, the anode terminal 13 is tilted relative to the cathode terminal 15, all illustrating the manner in which the mechanical stress, the strain, the displacement from parallel preciseness and the deviation in dimensions are absorbed. It is to be noted that, in FIG. 10, 21 represents an upper mold and 22 represents a lower mold.

In this way, when the capacitor element 12 is mold-encapsulated by means of the transfer molding, the displacement of the anode terminal face and the cathode terminal face results in deformation of the capacitor element 12 and imposition of mechanical stress and, moreover, the capacitor element 12 receives the mechanical stress as a result of the expansion of the anode and cathode terminals 13 and 15 as a result of the molding being performed at the high temperature of 130° C. to 200° C. However, these problems can be overcome by allowing the first and second bent portions 15e and 15f to be movable freely without being fixed to the capacitor element 12.

In this invention, in order to absorb the mechanical stress, the neck portion 15c must have a physical strength smaller than the physical strength of the capacitor element 12, the anode lead-out line 12a and the root portion of the anode lead-out line 12a and must have a width ½ to ⅔ of the width of the fixing portion 15b.

Figure 4:
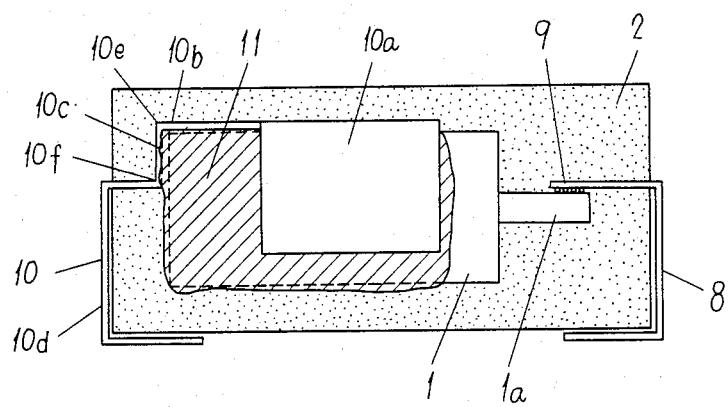
FIG. 4 is a sectional view of a chip-like solid electrolyte capacitor previously developed by the inventors.
Figure 5:
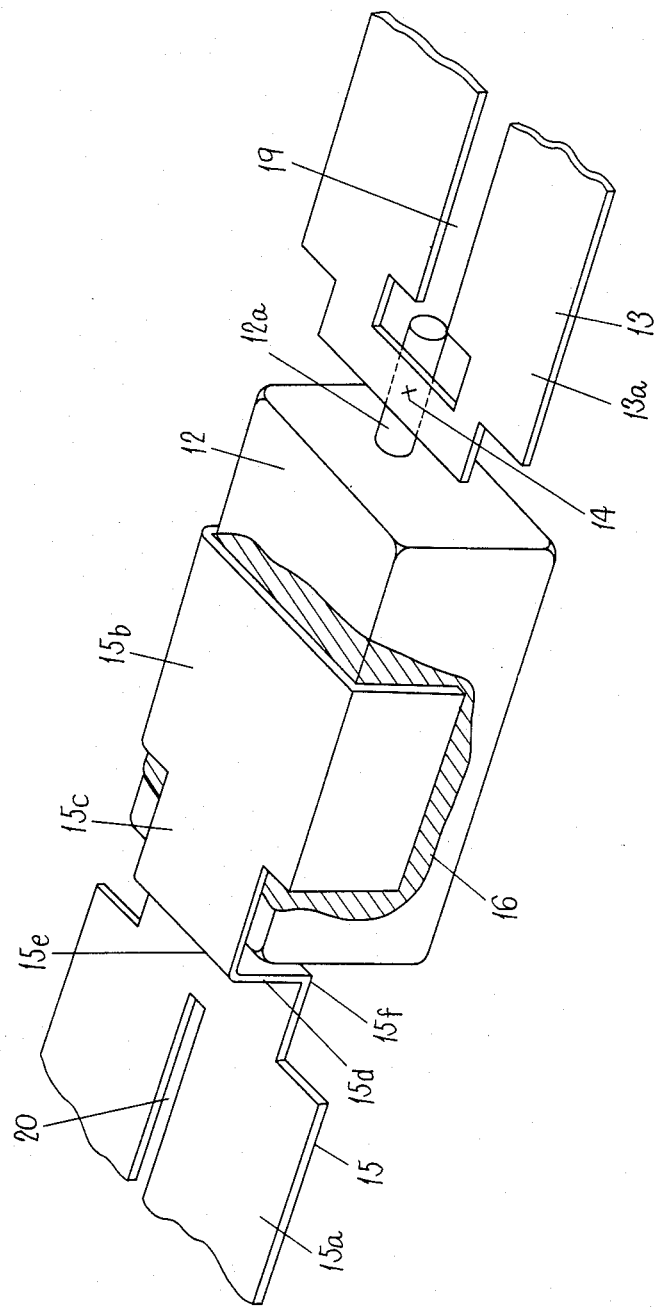
FIGS. 5, 6 and 7 are perspective views for showing the sequential manufacturing steps of a chip-like solid electrolyte capacitor according to one embodiment of this invention.

In the next place, the leakage current which will occur after the resin encapsulation in the case of the construction of this invention and in the case where, as shown in FIG. 4, the fixing to the capacitor element is made at the tip of the neck portion will be discussed.

A plurality of 35 V 10 μF capacitor elements are connected as shown in FIGS. 4 and 10 and set in a transfer molding machine, and the articles encapsulated with an epoxy resin at 150° C. and aged for 2 hours according to a conventional method.

The percentage of defective articles due to the current leakage is tabulated in the table below and it will readily be seen that the present invention is effective to make an improvement in the percentage of the number of the defective articles.

| TYPE | Number of Samples | Percentage of Number of Defective Articles Due to Current Leakage (%) |
| --- | --- | --- |
| Invention | n = 500 | 3.12 |
|  | n = 500 | 2.6 |
| Comparison | n = 450 | 8.1 |
|  | n = 446 | 6.2 |

INDUSTRIAL APPLICABILITY

As herinbefore described, in the chip-like solid electrolyte capacitor according to this invention, since the U-shaped fixing portion of the cathode terminal is soldered to the cathode layer of the capacitor element with the tip portion extending from the neck portion being allowed to move freely, the mechanical stress imposed on the capacitor element during the encapsulation by means of the transfer molding can be absorbed by the vertical portion having the first and second bent portions and, therefore, the deterioration of the capacitor element due to external mechanical mechanical stress can be avoided and, particularly, the number of defective capacitors produced due to current leakage can be remarkably reduced.

I claim:
1. A chip-like solid electrolyte capacitor comprising:
   a capacitor element constituted by an anode body, and a sequentially deposited semiconductor metal oxide layer and a cathode layer on the anode body;
   an anode lead-out line having a dielectric oxidizing film on one surface thereof and extending out of said capacitor element;
   an anode terminal connected to said anode lead-out line and having an anode connecting portion on the free end thereof;
   a cathode terminal connected to said cathode layer;
   said terminals extending outwardly from the opposite end faces of said body of insulating resin;
   said cathode terminal having a U-shaped fixing portion soldered to the cathode layer, a neck portion smaller in width than the fixing portion extending along and spaced from the surface of said capacitor element and having at most only a short length thereof adjacent said fixing portion soldered to said capacitor element, said cathode terminal further having a vertical portion extending along the end portion of said capacitor element and spaced therefrom and having first and second bent portion at the opposite ends, the first bent portion connecting said vertical portion to said neck portion, and an external cathode connecting portion extending from said second bent portion away from said capacitor element; and
   a body of encapsulating insulating resin around said capacitor element, said anode lead-out line, and parts of said anode and cathode terminals, the anode and cathode connecting portions extending outside said body of insulating resin.

2. A capacitor as claimed in claim 1 in which the width of the neck portion of said cathode terminal is from ½ to ⅔ of the width of said fixing portion.

3. A capacitor as claimed in claim 1 in which the connecting portions of said anode and cathode terminals extending outside said body of insulating material are bent into an L-shaped configuration and extend along the end and bottom faces of said body of insulating material.

4. A capacitor as claimed in claim 1 in which said anode and cathode connecting portions each having longitudinal slits therein dividing the connecting portions in half, whereby the capacitor has a four terminal structure.

* * * * *